(12) United States Patent
Dallal et al.

(10) Patent No.: US 11,476,905 B2
(45) Date of Patent: Oct. 18, 2022

(54) LINE-OF-SIGHT MULTIPLE-INPUT MULTIPLE-OUTPUT (LOS- MIMO) COMMUNICATIONS USING FOCUSING ELEMENTS

(71) Applicant: QUALCOMM INCORPORATED, San Diego, CA (US)

(72) Inventors: Yehonatan Dallal, Kfar Saba (IL); Idan Michael Horn, Hod Hasharon (IL); Shay Landis, Hod Hasharon (IL); Ran Berliner, Kfar-Aviv (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/195,056

(22) Filed: Mar. 8, 2021

(65) Prior Publication Data

US 2022/0286164 A1 Sep. 8, 2022

(51) Int. Cl.
*H04B 7/04* (2017.01)
*H04B 7/0456* (2017.01)
(Continued)

(52) U.S. Cl.
CPC ............ *H04B 7/0456* (2013.01); *H01Q 3/34* (2013.01); *H01Q 3/46* (2013.01); *H01Q 25/008* (2013.01);
(Continued)

(58) Field of Classification Search
CPC .. H04B 7/0456; H04B 7/0608; H04B 7/0802; H01Q 3/34; H01Q 3/46; H01Q 25/008
See application file for complete search history.

(56) References Cited

U.S. PATENT DOCUMENTS 7,965,242 B2 * 6/2011 Abramov ............... H01Q 21/28
343/702
9,531,450 B2 * 12/2016 Maltsev ............... H04B 7/0408
(Continued)

OTHER PUBLICATIONS

International Search Report and Written Opinion—PCT/US2022/015531—ISA/EPO—dated May 30, 2022.
(Continued)

*Primary Examiner* — Jean B Corrielus
(74) *Attorney, Agent, or Firm* — Haynes and Boone LLP/Qualcomm Incorporated

(57) ABSTRACT

A first wireless communication device includes a plurality of antenna elements, a transceiver coupled to the plurality of antenna elements, and a focusing element positioned in a transmitting path of at least one of the plurality of antenna elements. The transceiver is configured to transmit, to a second wireless communication device, a multiple-input multiple-output (MIMO) signal. The transceiver configured to transmit the MIMO signal is configured to: transmit, to the second wireless communication device via a first antenna element of the plurality of antenna elements, a first communication signal; and transmit, to the second wireless communication device via a second antenna element of the plurality of antenna elements, a second communication signal. The focusing element is configured to: direct the first communication signal in a first direction; and direct the second communication signal in a second direction different from the first direction.

28 Claims, 11 Drawing Sheets

(51) Int. Cl.
  *H04B 7/06*  (2006.01)
  *H01Q 25/00*  (2006.01)
  *H01Q 3/46*  (2006.01)
  *H01Q 3/34*  (2006.01)
  *H04B 7/08*  (2006.01)

(52) U.S. Cl.
  CPC ......... *H04B 7/0608* (2013.01); *H04B 7/0802* (2013.01)

(56) References Cited

U.S. PATENT DOCUMENTS

| 2002/0140617 | A1* | 10/2002 | Luly | H01Q 19/132 343/781 CA |
| 2015/0124732 | A1* | 5/2015 | Seo | H04L 5/0023 370/329 |
| 2017/0118773 | A1* | 4/2017 | Cariou | H04B 7/0413 |
| 2018/0131549 | A1* | 5/2018 | Berardinelli | H04L 27/263 |
| 2019/0044594 | A1* | 2/2019 | Kim | H04B 7/0617 |
| 2020/0319293 | A1* | 10/2020 | Kuriyama | G01S 7/03 |

OTHER PUBLICATIONS

Sayeed A.M., et al., "Continuous Aperture Phased MIMO: A New Architecture for Optimum Line-of-Sight Links", Antennas and Propagation (APSURSI), 2011 IEEE International Symposium ON, IEEE, Jul. 3, 2011 (Jul. 3, 2011), pp. 293-296, XP032191413, DOI: 10.11 09/APS.2011.5996700, ISBN: 978-1-4244-9562-7.

Zeng Y., et al., "Millimeter Wave MIMO With Lens Antenna Array: A New Path Division Multiplexing Paradigm", IEEE Transactions on Communications, IEEE Service Center, Piscataway, NJ, USA, vol. 64, No. 4, Apr. 1, 2016 (Apr. 1, 2016), pp. 1557-1571, XP011606472, ISSN: 0090-6778, Doi: 10.1109/TCOMM.2016. 2533490, [retrieved an Apr. 14, 2016].

* cited by examiner

LINE-OF-SIGHT MULTIPLE-INPUT MULTIPLE-OUTPUT (LOS- MIMO) COMMUNICATIONS USING FOCUSING ELEMENTS

TECHNICAL FIELD

This application relates to wireless communication systems and methods, and more particularly to multiple-input-multiple-output (MIMO) communication systems and methods.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Multiple-input multiple-output (MIMO) is a multi-antenna technology that exploits multipath signal propagation so that the information-carrying capacity of a wireless link can be multiplied by using multiple antennas at the transmitter and receiver to send multiple simultaneous data streams using different transmit/receive (tx/rx) antenna pairs. MIMO may be challenging or impractical, however, in some scenarios, such as short range or near-field communication scenarios where the channel for all of the tx/rx antenna pairs are highly correlated (e.g., with about the same channel characteristics).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure provides systems, devices, and methods for MIMO communications in LOS conditions. In some aspects, a wireless communication device includes a transceiver configured for MIMO communications with a second wireless communication device, and a focusing element. The transceiver includes a plurality of antenna elements, and the focusing element, which may include a lens or a dish, is positioned in a transmitting path of at least some of the plurality of antenna elements. The focusing element is configured to direct MIMO signals from individual antenna elements in different directions, and such that at least a portion of the signal energy of each of the MIMO signal is received by the second wireless communication device. That is, the utilization of the focusing element may render a highly correlated LOS channel into a highly uncorrelated channel to take advantage of MIMO communications.

According to one aspect of the present disclosure, a first wireless communication device includes a plurality of antenna elements and a transceiver coupled to the plurality of antenna elements. The transceiver is configured to transmit, to a second wireless communication device, a multiple-input multiple-output (MIMO) signal. The transceiver configured to transmit the MIMO signal is configured to: transmit, to the second wireless communication device via a first antenna element of the plurality of antenna elements, a first communication signal; and transmit, to the second wireless communication device via a second antenna element of the plurality of antenna elements, a second communication signal. The first wireless communication device further includes a focusing element positioned in a transmitting path of at least the first and second antenna elements. The focusing element is configured to: direct the first communication signal in a first direction; and direct the second communication signal in a second direction different from the first direction.

According to another aspect of the present disclosure, a first wireless communication device includes a plurality of antenna elements and a transceiver coupled to the plurality of antenna elements. The transceiver is configured to receive, from a second wireless communication device, a multiple-input multiple-output (MIMO) signal. The transceiver configured to receive the MIMO signal is configured to: receive, from the second wireless communication device via a first antenna element of the plurality of antenna elements, a first communication signal from a first direction; and receive, from the second wireless communication device via a second antenna element of the plurality of antenna elements, a second communication signal from a second direction different from the first direction. The first wireless communication device further includes a focusing element positioned in a receiving path of at least the first and second antenna elements. The focusing element is configured to: direct the first communication signal in the first direction; and direct the second communication signal in the second direction.

According to another aspect of the present disclosure, a first wireless communication device includes means for transmitting, to a second wireless communication device, a multiple-input-multiple-output (MIMO) signal. The means for transmitting the MIMO signal comprises: means for transmitting, to the second wireless communication device via a first antenna element of the plurality of antenna elements, a first communication signal; and means for transmitting, to the second wireless communication device via a second antenna element of the plurality of antenna elements, a second communication signal. The first wireless communication device further includes means for directing the first communication signal in a first direction; and means for directing the second communication signal in a second direction different from the first direction.

According to another aspects of the present disclosure, a first wireless communication device includes means for receiving, from a second wireless communication device, a multiple-input-multiple-output (MIMO) signal. The means for receiving the MIMO signal includes: means for receiving, from the second wireless communication device via a first antenna element of the plurality of antenna elements, a first communication signal from a first direction; and means for receiving, from the second wireless communication device via a second antenna element of the plurality of antenna elements, a second communication signal from a second direction different from the first direction. The first wireless communication device further includes: means for directing the first communication signal in the first direction; and means for directing the second communication signal in the second direction.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

second wireless communication device, according to aspects of the present disclosure.

Figure 5:
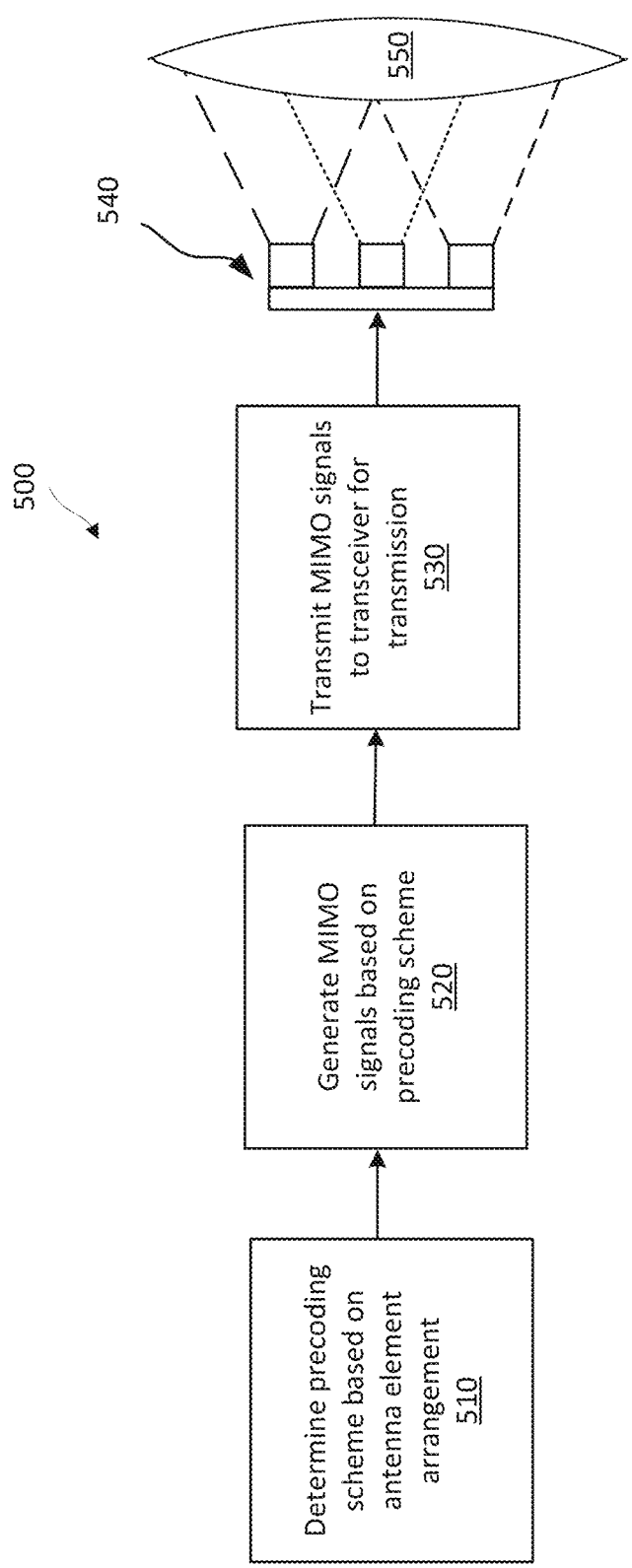

FIG. 5 is a diagram of a MIMO precoding scheme, according to aspects of the present disclosure.

Figure 6:
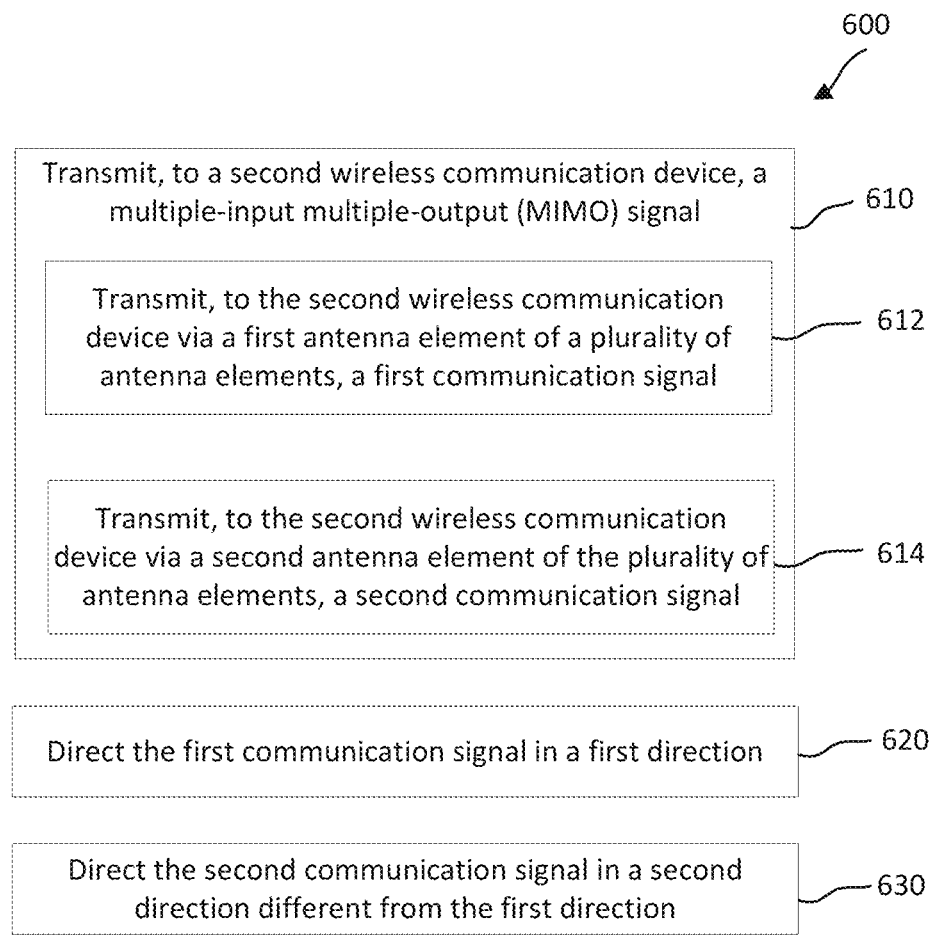

FIG. 6 is a flow diagram of a communication method according to some aspects of the present disclosure.

Figure 7:
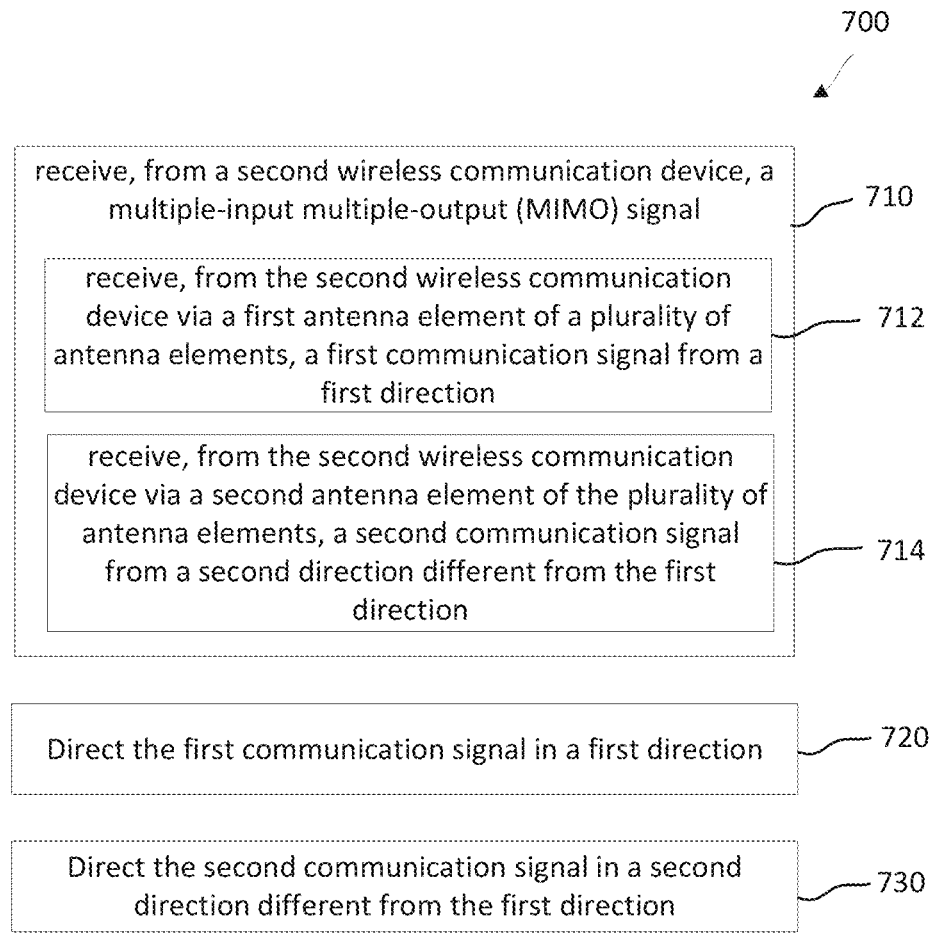

FIG. 7 is a flow diagram of a communication method according to some aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-1-DMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an orthogonal frequency-division multiplexing (OFDM)-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

A channel, such as a multiple-input multiple-output (MIMO) channel, between transmit/receive (tx/rx) antenna pairs may be represented by a channel matrix. The channel rank is related to eigenvalues of the channel matrix, and the eigenvalues may characterize the MIMO channel capacity. For example, a higher channel rank (a channel matrix having a greater number of strong eigenvalues) may provide a higher MIMO channel capacity, whereas a lower channel rank (a channel matrix having a fewer number of non-zero eigenvalues or weak eigenvalues) may provide a lower MIMO channel capacity. In some examples, a strong eigenvalue may have a normalized value that is greater than about 0.5. A LOS channel is typically highly correlated with a low channel rank. That is, a LOS channel, especially when a transmitter and a corresponding receiver is spaced apart by a short distance (e.g., less than 1 meter), may not be able to take advantage of MIMO operations to achieve a high channel capacity.

The present application describes systems, devices, and methods for facilitating line-of-sight (LOS) MIMO communication using focusing elements, such as lenses or dishes to increase channel ranks. That is, the focusing elements may render a highly correlated LOS channel into a highly uncorrelated channel to take advantage of MIMO communications. In this regard, in some instances, it may be difficult to separate or distinguish different MIMO communication signals (multiple links) to establish multiple simultaneous, parallel communication streams over a channel with low channel rank. For example, in short range, line-of-sight (LOS) communication scenarios, the antenna elements of an antenna array at a transmitter and the antenna elements of an antenna array at a corresponding receiver may be highly correlated resulting in a low-rank channel, and the channel or channel characteristics may be essentially the same for all tx/rx antenna pairs. Accordingly, the present disclosure includes using focusing elements, such as a lens or dish, together with individual transmitting and receiving antenna elements to provide higher rank channels in LOS conditions. Using optical focusing elements allows for increased spatial resolution (providing multiple separable links), and therefore higher channel ranks, without increasing the processing demands on the wireless communication device. In some aspects, focusing elements can be used for either or both of the transmitting wireless communication device or the receiving wireless communication device. Further, the focusing elements may allow for increased channel rank while maintaining relatively small inter-antenna element spacing. Accordingly, the size or footprint of the antenna element can be maintained or even reduced, in some instances.

Figure 1:
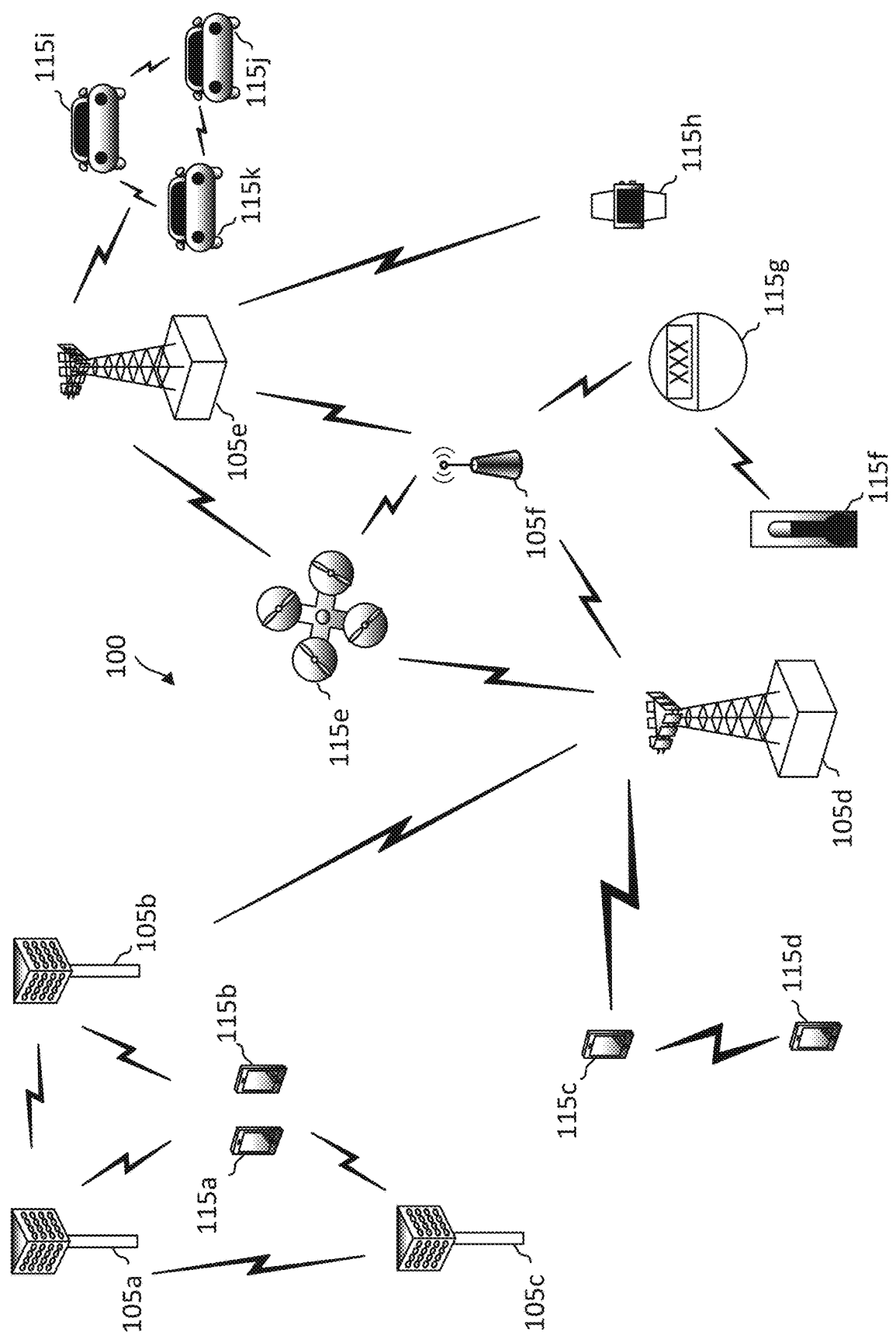
FIG. 1 illustrates a wireless communication network according to some aspects of the present disclosure.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smartphone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding.

The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, nodes or devices in the network 100 may operate using a MIMO communication scheme. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another. In some instances, it may be difficult to separate or distinguish the different communication streams. For example, in short range, line-of-sight (LOS) communication scenarios, the antenna elements of an antenna array may be highly correlated, and the received signals may be essentially the same for all tx/rx antenna pairs. The present disclosure includes using focusing elements, such as a lens or dish, together with individual transmitting and receiving antenna elements to provide higher rank channels in LOS conditions by increasing the spatial resolution.

Figure 2:
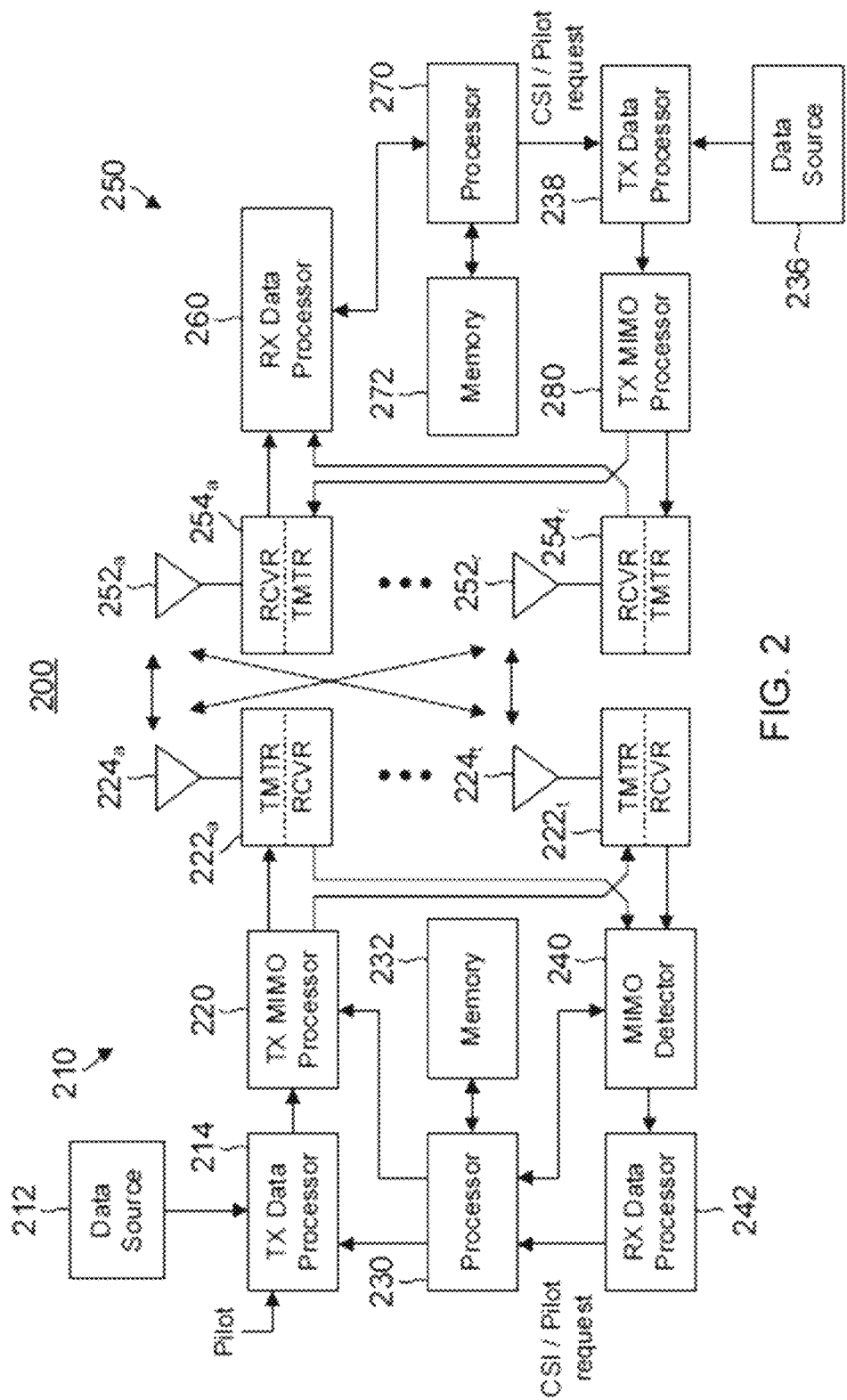
FIG. 2 is a block diagram illustrating an exemplary wireless communication system in accordance with various aspects of the present disclosure.

FIG. 2 is a block diagram illustrating an exemplary transmitter system 210 (e.g., a base station 110) and a receiver system 250 (e.g., a UE 120) in a MIMO system 200, according to certain aspects of the present disclosure. At the transmitter system 210, traffic data for a number of data streams is provided from a data source 212 to a transmit (TX) data processor 214.

In a downlink transmission, for example, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data and control data using OFDM techniques. The pilot and control data are typically a known data pattern that is processed in a known manner and may be used at the receiver system to estimate the channel response or other channel parameters. Pilot data may be formatted into pilot symbols. The number of pilot symbols and placement of pilot symbols within an OFDM symbol may be determined by instructions performed by processor 230. Similarly, control data may be formatted into control symbols. The number of control symbols and placement of control symbols within an OFDM symbol may be determined by instructions performed by processor 230.

The multiplexed pilot and coded data for each data stream is then modulated (i.e., symbol mapped) based on a particular modulation scheme (e.g., binary-phase-shift-keying (BPS K), quadrature-phase-shift-keying (QPSK), m-ary-phase-shift-keying (M-PSK), or m-ary-quadrature amplitude modulation (M-QAM)) selected for that data stream to provide modulation symbols. The data rate, coding, and modulation for each data stream may be determined by instructions performed by processor 230. The number of pilot symbols and placement of the pilot symbols in each frame may also be determined by instructions performed by processor 230. Similarly, the number of control symbols and placement of the control symbols in each frame may also be determined by instructions performed by processor 230. Similarly, the number of data symbols and placement of the data symbols in each frame may also be determined by instructions performed by processor 230.

The processor 230 may be implemented using a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The processor 230 may also be implemented as a combination of computing devices, e.g., a combination of a DSP and a microprocessor, a plurality of microprocessors, one or more microprocessors in conjunction with a DSP core, or any other such configuration.

The transmitter system 210 further includes a memory 232. The memory 232 may be any electronic component capable of storing information and/or instructions. For example, the memory 232 may include random access memory (RAM), read-only memory (ROM), flash memory devices in RAM, optical storage media, erasable programmable read-only memory (EPROM), registers, or combinations thereof. In an embodiment, the memory 232 includes a non-transitory computer-readable medium.

Instructions or code may be stored in the memory 232 that are executable by the processor 230. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The modulation symbols for all data streams are then provided to a TX MIMO processor 220, that may further process the modulation symbols (e.g., for OFDM). TX MIMO processor 220 then provides a number (e.g., represented by t) of modulation symbol streams to t transmitter/receivers (TMTR/RCVR) 222a through 222t. In some embodiments, TX MIMO processor 220 applies beamforming weights to the symbols of the data streams and to the antenna from which the symbol is being transmitted. The transmitter system 210 includes embodiments having only one antenna or having multiple antennas.

Each transmitter/receiver 222 receives and processes a respective symbol stream to provide one or more analog signals, and further conditions (e.g., amplifies, filters, and upconverts) the analog signals to provide a modulated signal suitable for transmission over the MIMO channel t modulated signals from transmitter/receivers 222a through 222t are then transmitted from t antennas 224a through 224t, respectively. The techniques described herein apply also to systems with only one transmit antenna. Transmission using one antenna is simpler than the multi-antenna scenario. For example, there may be no need for TX MIMO processor 220 in a single antenna scenario.

At receiver system 250, the transmitted modulated signals are received by NR antennas 252a through 252r and the received signal from each antenna 252 is provided to a respective receiver/transmitter (RCVR/TMTR) 254a through 254r. Each receiver/transmitter 254 conditions (e.g., filters, amplifies, and downconverts) a respective received signal, digitizes the conditioned signal to provide samples, and further processes the samples to provide a corresponding "received" symbol stream. The techniques described herein also apply to embodiments of receiver system 250 having only one antenna 252.

An RX data processor 260 then receives and processes the NR received symbol streams from NR receiver/transmitters 254 based on a particular receiver processing technique to provide t detected symbol streams. The RX data processor 260 then demodulates, deinterleaves, and decodes as necessary each detected symbol stream to recover the traffic data for the data stream. The processing by RX data processor 260 is complementary to that performed by TX MIMO processor 220 and TX data processor 214 at transmitter system 210.

Information provided by the RX data processor 260 allows the processor 270 to generate reports such as channel state information (CSI) and/or a pilot request to provide to the TX Data Processor 238. Processor 270 formulates a reverse link message including the CSI and/or pilot request to transmit to the transmitter system.

The processor 270 may be implemented using a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The processor 270 may also be implemented as a combination of computing devices, e.g., a combination of a DSP and a microprocessor, a plurality of microprocessors, one or more microprocessors in conjunction with a DSP core, or any other such configuration.

The reverse link message may include various types of information regarding the communication link and/or the received data stream. The reverse link message is then processed by a TX data processor 238, which also receives traffic data for a number of data streams from a data source 236, modulated by a TX MIMO processor 280, conditioned by transmitters 254a through 254r, and transmitted back to transmitter system 210.

The transmitter system 210 further includes a memory 272 in communication with the processor 270. Similar to the memory 232, the memory 272 may be any electronic component capable of storing information and/or instructions. The instructions stored on the memory 272 may include instructions for generating reports such as channel state information (CSI) and/or a pilot request to provide to the TX Data Processor 238 and/or for formulating a reverse link message including the CSI and/or pilot request to transmit to the transmitter system. The memory 272 may include random access memory (RAM), read-only memory (ROM), flash memory devices in RAM, optical storage media, erasable programmable read-only memory (EPROM), registers, or combinations thereof. In an embodiment, the memory 272 includes a non-transitory computer-readable medium.

Instructions or code may be stored in the memory 272 that are executable by the processor 270. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

At transmitter system 210, the modulated signals from receiver system 250 are received by antennas 224, conditioned by transmitter/receivers 222, demodulated by a demodulator 240, and processed by a RX data processor 242 to extract the reverse link message transmitted by the receiver system 250.

Figure 3A:
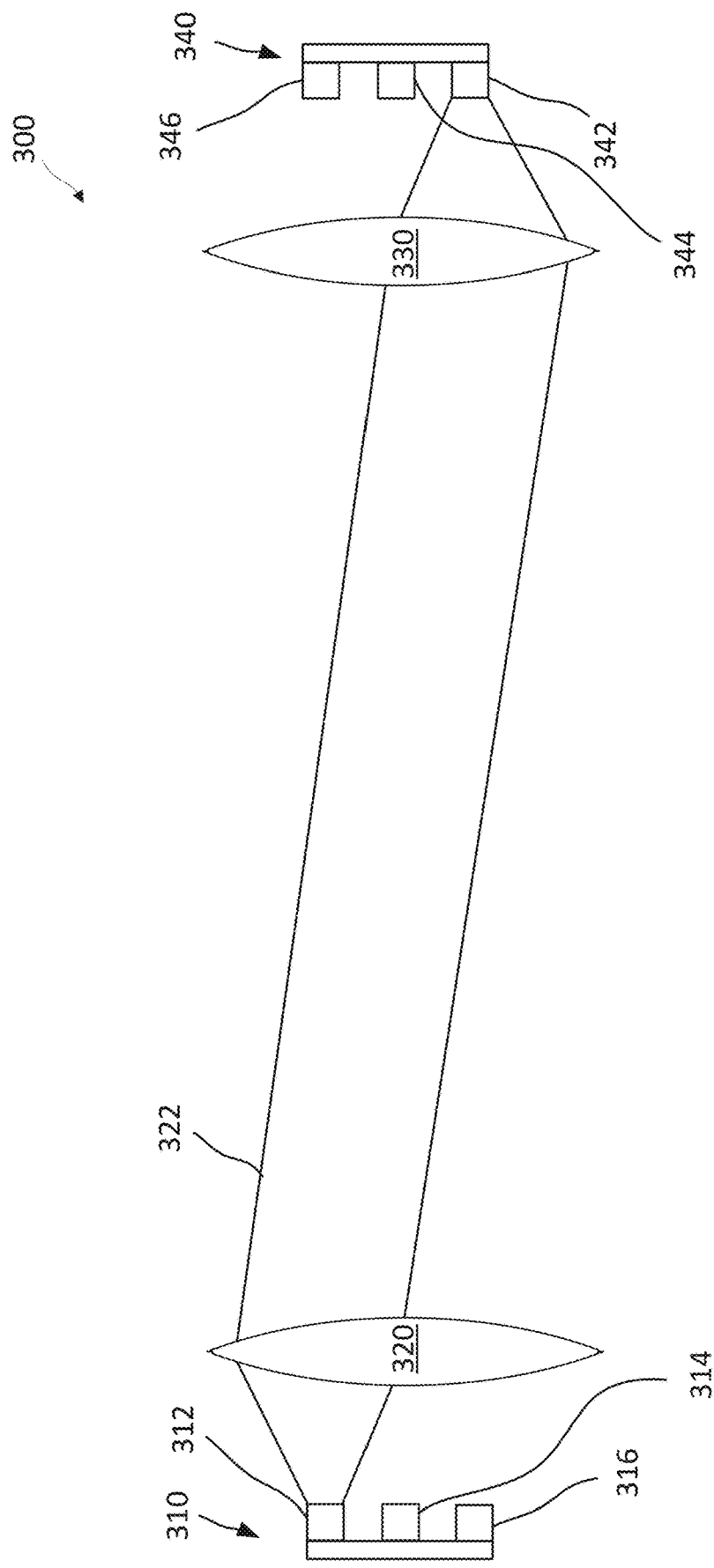
FIG. 3A is a diagram of a multiple-input multiple-output (MIMO) communication scenario utilizing focusing elements, according to aspects of the present disclosure.
Figure 3B:
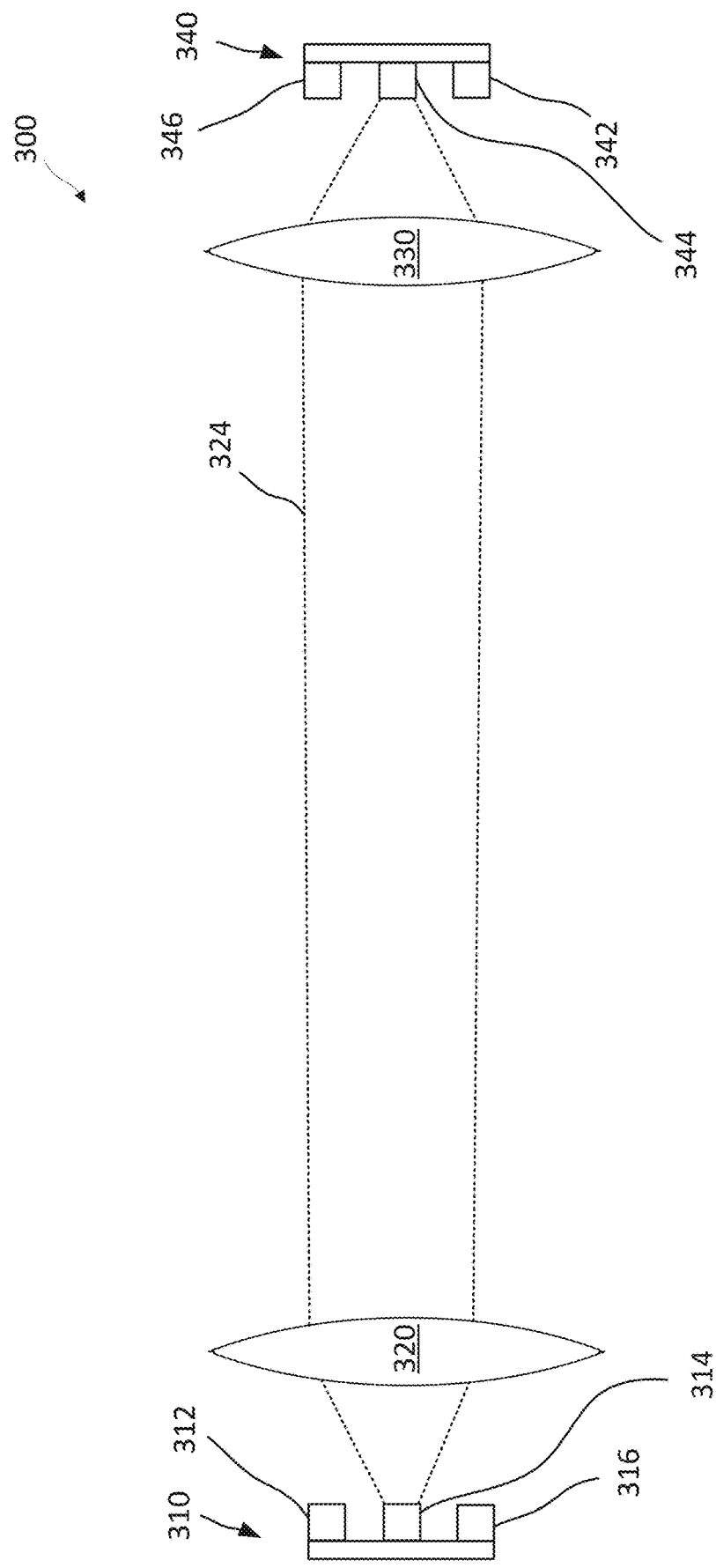
FIG. 3B is a diagram of a MIMO communication scenario utilizing focusing elements, according to aspects of the present disclosure.
Figure 3C:
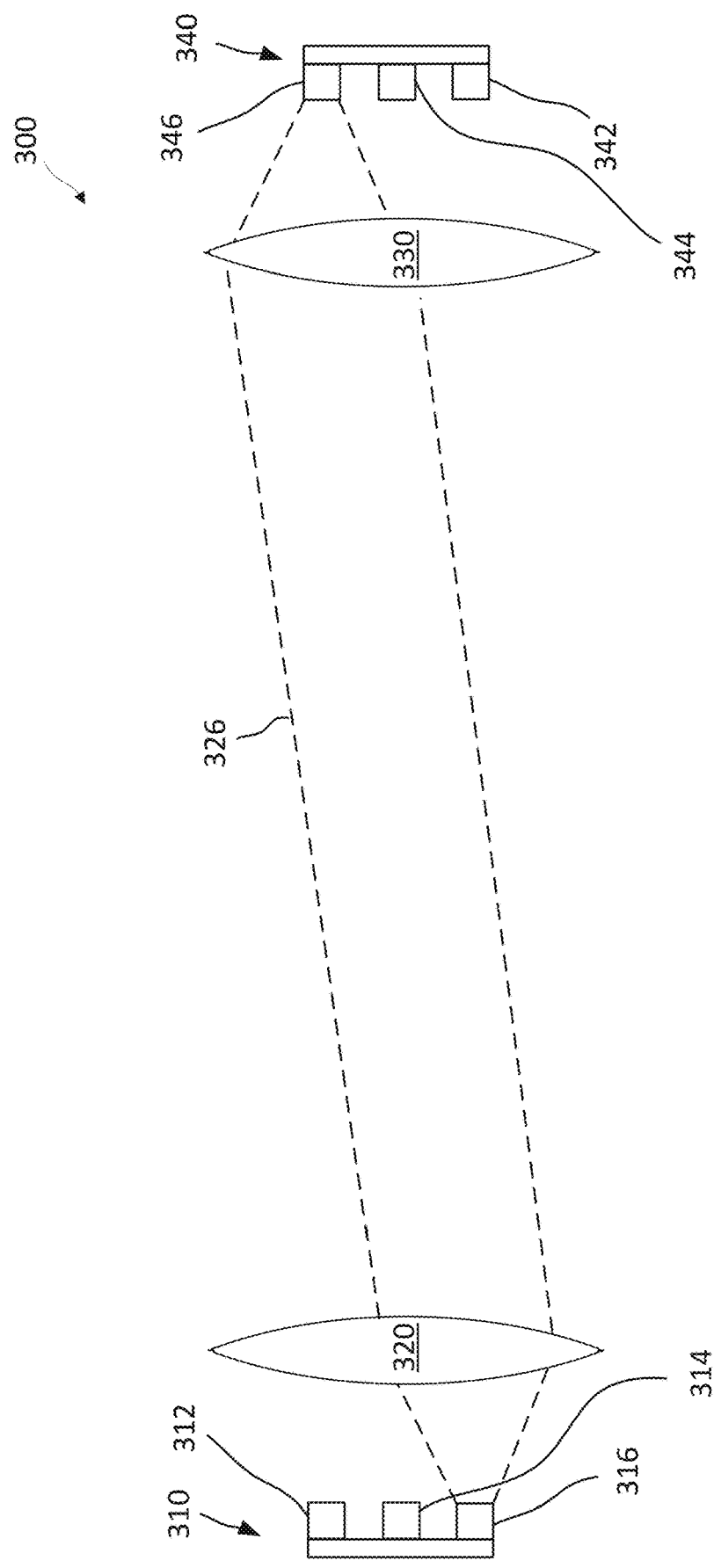
FIG. 3C is a diagram of a MIMO communication scenario utilizing focusing elements, according to aspects of the present disclosure.

FIGS. 3A, 3B, and 3C are discussed in relation to each other to illustrate a MIMO communication scenario 300 utilizing focusing elements 320 and 330. The transmitting node 310 and/or the receiving node 340 may include a BS, such as one of the BSs 105 of the network, a UE, such as one of the UEs 115 of the network 100, or any other suitable type of wireless node. In an exemplary aspect, the transmitting node 310 and the receiving node 340 each include BSs, such as BSs 105 in the network 100. In another exemplary aspect, the transmitting node 310 and the receiving node 340 may correspond to a portion (e.g., the antennas 224) of the transmitter system 210 and a portion (e.g., the antennas 252) of the receiver system 250, respectively. In the scenario 300, the receiving node 340 is within a line of sight (LOS) of the transmitting node 310. LOS may describe a scenario in which minimal or no electromagnetic obstructions are in in the beam path of signals transmitted from the transmitting node 310 to the receiving node 340 (and vice versa), and in which the receiving node 340 is relatively close to the transmitting node 310, such as within 5 meters, and in general may depend both on antenna aperture and the wavelength associated with the carrier frequency.

In the scenario 300, the transmitting node 310 includes a plurality of antenna elements, shown as a first antenna element 312, a second antenna element 314, and a third antenna element 316. The antenna elements 312, 314, 316 may comprise or form part of an antenna array configured for MIMO communications with the receiving node 340. In one example, transmitting node 310 may correspond with transmitter system 210 and antenna elements 312, 314, and 316 may correspond with antennas 224 with reference to FIG. 2. Similarly, the receiving node 340 includes a plurality of antenna elements, shown as a first antenna element 342, a second antenna element 344, and a third antenna element 346. In one example, receiving node 340 may correspond with receiver system 250 and antenna elements 342, 344, and 346 may correspond with antennas 252 with reference to FIG. 2.

Referring to FIG. 3A, the transmitting node 310 is configured to transmit, via the first antenna element 312, a first signal 322 having a first direction or path, and the receiving node 340 is configured to receive, via the first antenna element 342, the first signal 322. Referring to FIG. 3B, the transmitting node 310 is configured to transmit, via the second antenna element 314, a second signal 324 having a second direction, and the receiving node 340 is further configured to receive, via the second antenna element 344, the second signal 324. Referring to FIG. 3C, the transmitting node 310 is further configured to transmit, via the third antenna element 316, a third signal 326 having a third direction, and the receiving node 340 is further configured to receive, via the third antenna element 346, the third signal 326. Referring generally to FIGS. 3A-3C, although shown separately in separate figures, it will be understood that the transmitting node 310 may be configured to transmit the first signal 322, the second signal 324, and the third signal 326 simultaneously, in some aspects. It will also be understood that the receiving node 340 may be configured to receive the first signal 322, the second signal 324, and the third signal 326 simultaneously, in some aspects.

Generally, the antenna elements of node 340 may be used in combination to receive a combination of the signals from node 310 using, for example, a singular value decomposition (SVD) MIMO approach.

The antenna elements of the transmitting node 310 and the receiving node 340 may be positioned on an antenna surface, and arranged in a spaced relationship with respect to one another. The arrangement of the antenna elements may be associated with an antenna aperture. The antenna elements may be arranged in a hexagonal, triangular, square, circular, or any other suitable arrangement. In some aspects, the spacing between each antenna element and a nearest neighboring antenna element may be equal, or approximately equal, for each antenna element of the array (e.g., hexagonal, square antenna arrangement). In other aspects, the spacing between each antenna element and the nearest neighboring antenna element varies (e.g., circular antenna arrangement). In some aspects, the antenna elements may be positioned 100 mm or less from a nearest neighboring antenna element. For example, in some aspects, each antenna element is positioned approximately 50 mm, 40 mm, 30 mm, 20 mm, 10 mm, 5 mm, or any other suitable distance from a nearest neighboring antenna element, both greater or smaller. Although three antenna elements (e.g., 312, 314, 316) are shown for each node 310, 340, it will be understood that each node may include other Numbers of antenna elements, such as 2, 4, 5, 7, 10, 15, 20, 30, 50, or any other number of antenna elements, both greater or smaller. The transmitting node 310 is configured to transmit signals from one antenna element, or subgroup of antenna elements, to a corresponding antenna element or subgroup of antenna elements of the receiving node 340 according to a MIMO communication scheme. In some aspects, the nodes 310, 340 may be configured to communicate in a massive MIMO communication scheme.

As explained above, MIMO communication can be challenging in LOS conditions, as different antenna elements may be highly correlated, and the channels for all rx/tx antenna element pairs between the nodes can be very similar. In other words, the complete channel matrix may be effectively low rank for LOS MIMO communications. The channel matrix H, which is a complex matrix of channel coefficients, has a single value decomposition (SVD) described by:

$$H_{m \times n} = \underline{U}_{m \times m} S_{m \times n} V_{n \times n}^\dagger \quad (1),$$

where $\underline{U}_{m \times m}$ and $V_{n \times n}$ are unitary matrices, and $S_{m \times n}$ is a rectangular matrix. The time-invariant channel can be described by:

$$y_{m \times 1} = H_{m \times n} x_{n \times 1} + w_{m \times 1} \quad (2),$$

where $y_{m \times 1}$ is the received signal, $x_{n \times 1}$ is the transmitted signal, m is the number of receiving elements, n is the number of transmitting elements.

According to equations (1) and (2), when decomposed into its eigen channels, H has only a few strong eigenvalues. For example, at a frequency of 145 GHz and for an aperture of 100 mm and antennas having seven antenna elements each, there are only two channel eigenvalues that exceed a normalized value of 0.5, and some of the channel eigenvalues are lower than 0.1. As described above, eigenvalues of a channel matrix characterize the MIMO channel capacity, where a greater number of strong eigenvalues may indicate a channel with a higher MIMO channel capacity. Accordingly, in this scenario, LOS MIMO may be impractical or deficient, in the absence of focusing elements.

As shown in FIGS. 3A-3C, focusing elements 320, 330 are positioned in the signal path for each wireless node 310, 340. In particular, a first focusing element 320 is positioned within the transmitting path of the transmitting node 310, and a second focusing element 330 is positioned within the receiving path of the receiving node 340. The focusing elements 320, 330 are illustrated as lenses, such as polytetrafluoroethylene (PTFE) lens antennas. However, other types of focusing elements may be used instead of, or in addition to, the lenses shown in FIGS. 3A-3C. For example, in some aspects, reflective dishes are used instead of or in addition to the focusing elements 320, 330. The focusing elements 320, 330 are configured to direct, refract, focus, or otherwise adjust the direction and/or propagation characteristics of the signals transmitted by the transmitting node 310. In the scenario 300 of FIGS. 3A-3C, the signals are shown as diverging in direction and traveling generally toward the receiving node 340 such that at least a portion of the energy of each signal 322, 324, 326 reaches the receiving node 340. The second focusing element 330 focuses or directs the portions of the signals onto the respective or corresponding antenna elements. In particular, the focusing element 330 focuses or directs the first signal 322 onto the first antenna element 342 of the receiving node 340, the second signal 324 onto the second antenna element 344 of the receiving node 340, and the third signal 326 onto the third antenna element 346. However, it will be understood that the focusing element 330 may not focus all of the energy of each signal onto its respective receiving antenna element. For example, portions of the focused energy of the first signal 322 may be received by the second antenna element 344 and/or the third antenna element 346, in addition to the first antenna element 342.

The focusing elements 320, 330, individually or in combination, provide for higher rank channels to be obtained in LOS conditions by increasing the spatial resolution. In some aspects, the scenario 300 may correspond to near field scenarios described by:

$$R < \frac{2D^2}{\lambda}, \quad (3)$$

where D is the lens diameter, R is the distance between the transmitting and receiving nodes, and λ is the wavelength corresponding to the carrier frequency of the wireless communication. In one example, each of nodes 310 and 340 comprises seven antenna elements and each of focusing elements 320 and 330 comprises a lens having a diameter of 100 mm and a focal length of 151. In such an example, all seven channel eigenvalues may exceed a value of 0.5 with less than 40% variation in channel eigenvalues. In this example configuration, at each node, six antenna elements are evenly spaced at the perimeter of a circle with a seventh antenna element at the center, where the perimeter of the circle corresponds, for example, to the perimeter of the lens. In comparison, two nodes with seven antenna elements each (in a different configuration from the previous example), but without lenses or focusing elements, may only have two channel eigenvalues exceeding 0.5, where the eigenvalues span more than a decade (i.e., where the eigenvalues have very high variance).

Figure 4A:
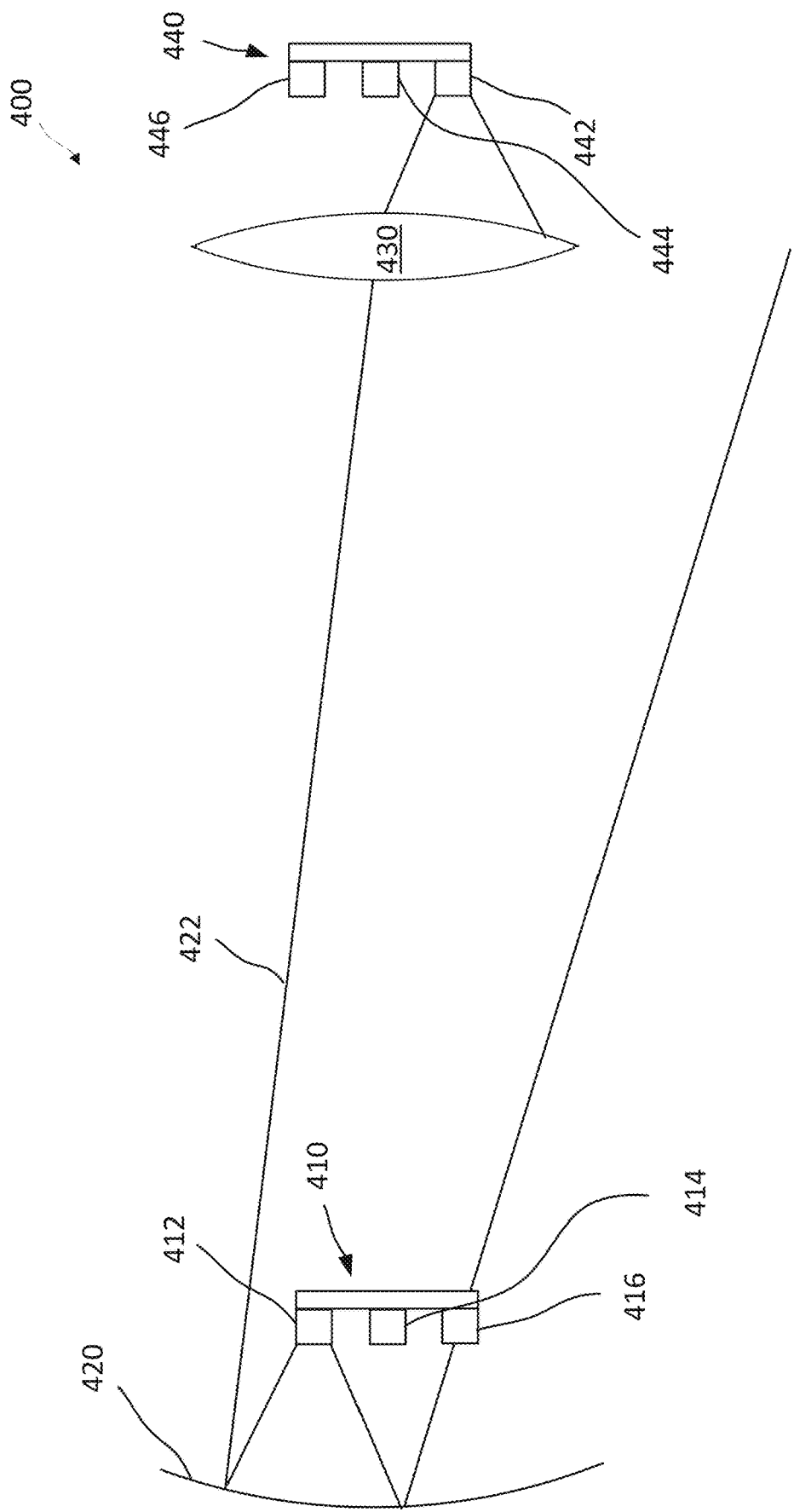
FIG. 4A is a diagram of a MIMO communication scenario utilizing focusing elements, according to aspects of the present disclosure.
Figure 4B:
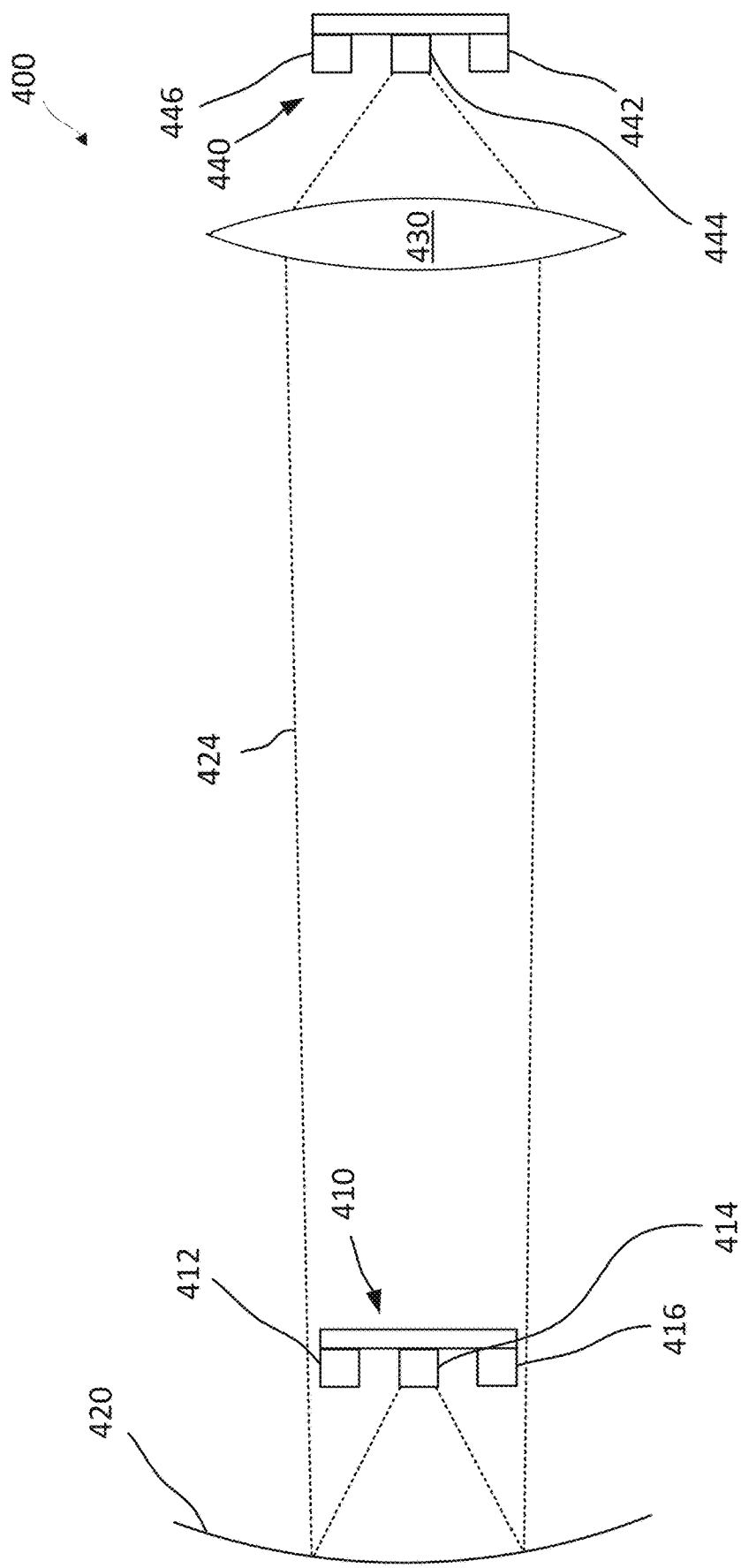
FIG. 4B is a diagram of a MIMO communication scenario utilizing focusing elements, according to aspects of the present disclosure.
Figure 4C:
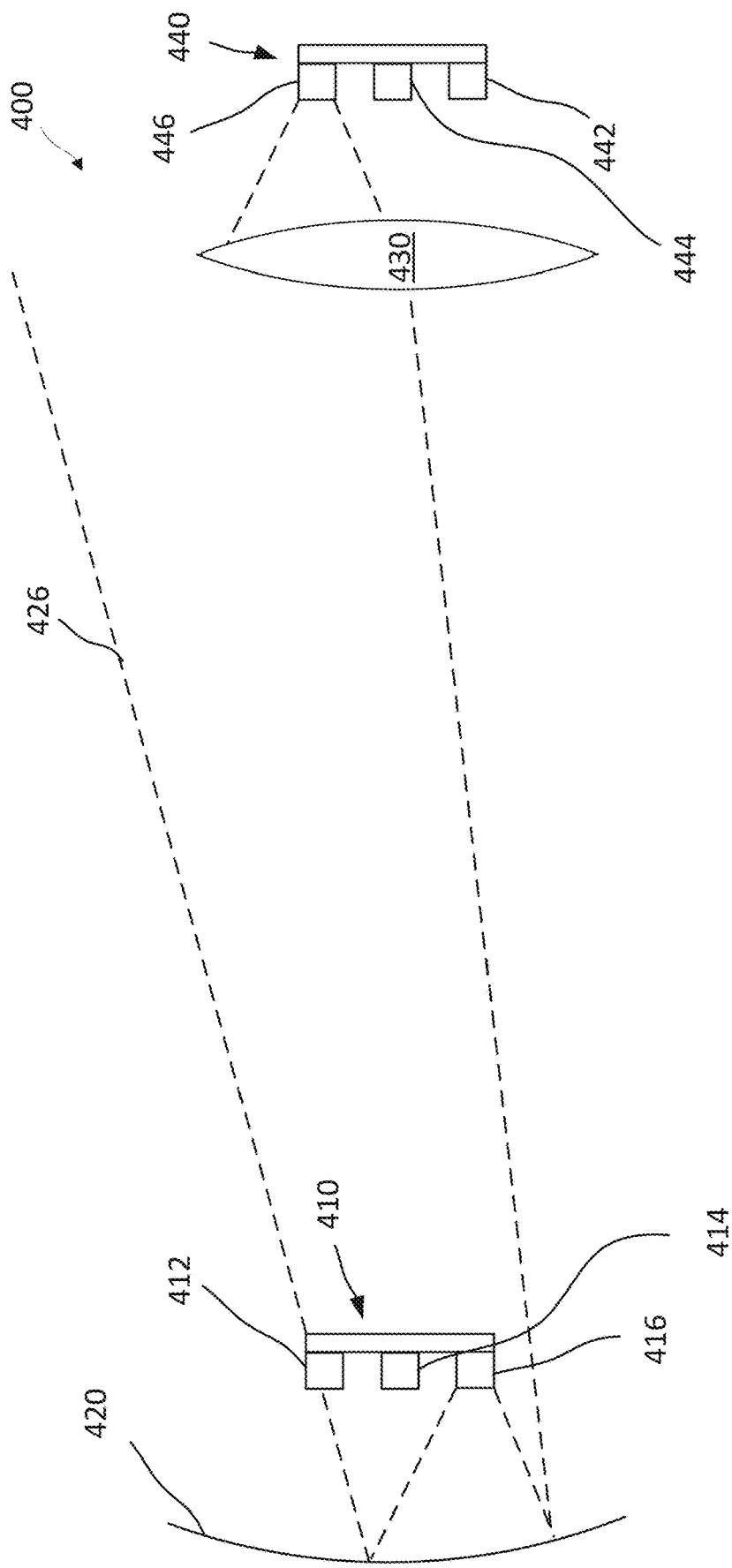
FIG. 4C is a diagram of a MIMO communication scenario utilizing focusing elements, according to aspects of the present disclosure.

Although the focusing elements 320, 330 are shown as including lenses (e.g., PTFE lenses), it will be understood that other types of focusing elements can be used instead of or in addition to lenses. In this regard, FIGS. 4A, 4B, and 4C are discussed in relation to each other to illustrate a MIMO communication scenario 400 utilizing focusing elements 420 and 430. In the scenario 400, the transmitting node 410 includes a plurality of antenna elements, including a first antenna element 412, a second antenna element 414, and a third antenna element 416. The antenna elements 412, 414, 416 may comprise or form part of an antenna array configured for MIMO communications with the receiving node 440. Similarly, the receiving node 440 includes a first antenna element 442, a second antenna element 444, and a third antenna element 446.

Referring to FIG. 4A, the transmitting node 410 is configured to transmit, via the first antenna element 412, a first signal 422 having a first direction or path, and the receiving node 440 is configured to receive, via the second antenna element 414, the first signal 422. Referring to FIG. 4B, the transmitting node 410 is configured to transmit, via the second antenna element 414, a second signal 424 having a second direction, and the receiving node 440 is further configured to receive, via the second antenna element 444, the second signal 424. Referring to FIG. 4C, the transmitting node 410 is further configured to transmit, via the third antenna element 416, a third signal 426 having a third direction, and the receiving node 440 is further configured to receive, via the third antenna element 446, the third signal 426. Referring generally to FIGS. 4A-4C, although shown separately in separate figures, it will be understood that the transmitting node 410 may be configured to transmit the first signal 422, the second signal 424, and the third signal 426 simultaneously, in some aspects. It will also be understood that the receiving node 440 may be configured to receive the first signal 422, the second signal 424, and the third signal 426 simultaneously, in some aspects.

The antenna elements of the transmitting node 410 and the receiving node 440 may be positioned on an antenna surface, and arranged in a spaced relationship with respect to one another. The arrangement of the antenna elements may be associated with an antenna aperture. The antenna elements may be arranged in a hexagonal, triangular, square, circular, or any other suitable arrangement. In some aspects, the spacing between each antenna element and a nearest neighboring antenna element may be equal, or approximately equal, for each antenna element of the array (e.g., hexagonal, square antenna arrangement). In other aspects, the spacing between each antenna element and the nearest neighboring antenna element varies (e.g., circular antenna arrangement). In some aspects, the antenna elements may be positioned 100 mm or less from a nearest neighboring antenna element. For example, in some aspects, each antenna element is positioned approximately 50 mm, 40 mm, 30 mm, 20 mm, 10 mm, 5 mm, or any other suitable distance from a nearest neighboring antenna element, both greater or smaller. Although three antenna elements (412, 414, 416) are shown for each node 410, 440, it will be understood that each node may include other numbers of antenna elements, such as 2, 4, 5, 7, 10, 15, 20, 30, 50, or any other number of antenna elements, both greater or smaller. The transmitting node 410 is configured to transmit signals from one antenna element, or subgroup of antenna elements, to a corresponding antenna element or subgroup of antenna elements of the receiving node 440 according to a MIMO communication scheme. In some aspects, the nodes 410, 440 may be configured to communicate in a massive MIMO communication scheme.

The dish 420 may focus, direct, or otherwise modify the beam direction and propagation of a signal in a manner similar to the focusing element 320 shown in FIG. 3. For example, the dish 420 may be described as having a focal length and a diameter. The dish 420 directs the signals 422, 424, 426 in diverging directions that travel generally toward the receiving node 440. The lens 430 focuses at least a portion of the energy of each of the signals 422, 424, 426 to be received by the respective antenna elements 442, 444, 446. Similar to the focusing elements 320, 330 shown in FIG. 3, the dish 420 and lens 430 in the scenario 400 of FIGS. 4A-4C allow for higher rank channels to be obtained in a LOS MIMO communication scheme.

Referring generally to FIGS. 3A, 3B, 3C, and 4A, 4B, and 4C, it will be understood that the transmitting nodes 310, 410 may also be configured to receive signals from the receiving nodes 340, 440, or from other wireless nodes. Further, it will be understood that any suitable focusing element or combination of focusing elements may be used in a LOS MIMO communication scheme. For example, in some aspects, the transmitting node 310 may include a lens, and the receiving node 340, 440 includes a dish. In other aspects, both nodes 310, 340 include dishes. In some aspects, only the transmitting node 310, 410 includes a focusing element, and the receiving node does not include a focusing element, or vice versa. For example, In some aspects, one or both of the transmitting node 310 or the receiving node 340 include(s) a combination of lenses and/or dishes to direct or focus signal energy.

FIG. 5 is a diagram illustrating a MIMO precoding and signal generation scheme 500, according to aspects of the present disclosure. The scheme 500 may be performed by a wireless node, such as a BS or a UE, such as a BS 105 or a UE 115 in the network 100 shown in FIG. 1. In some aspects, the wireless node may include the transmitter system 210 of the MIMO system 200 shown in FIG. 2. The wireless node includes an antenna array 540 including a plurality of antenna elements, and a focusing element 550. The focusing element 550 may include a lens and/or a dish, as explained above. The focusing element 550 may allow for MIMO communications with another wireless node in LOS conditions, including near field LOS conditions.

At block 510 of the scheme 500, the wireless node determines a precoding scheme based at least in part on an arrangement of the antenna elements of the array 540. For example, the precoding scheme may be based on the aperture of the array 540, the spacing between elements of the array 540, the shape or pattern of the arrangement (e.g., hexagonal, square, circular), or any other suitable aspect of the antenna element arrangement. In some aspects, a suitable precoding algorithm may include or otherwise involve scaling the amplitude and phase of different MIMO communication streams. The precoding scheme or algorithm may be further based on known channel state information. At the receiving wireless node, the different spatial signatures of the respective MIMO communication streams (and, in some examples, known channel state information) can enable the separation of these streams from one another. The wireless node may use any suitable component to perform the actions of block 510, such as a processor and/or one or more components of the MIMO transmitter system 210 shown in FIG. 2, such as the TX data processor 214, TX MIMO processor 220, processor 230, memory 232, transmitter/receiver 222 and/or antenna 224, or any other suitable component described above.

At block 520, the wireless node generates MIMO signals based on the precoding scheme. In particular, the wireless node may be configured for MIMO communications with a second wireless node that includes a second array of antenna elements. In some aspects, the wireless node may be configured to transmit MIMO signals from a first antenna element or subgroup of elements to a second antenna element or subgroup of elements of the second wireless node. Thus, multiple MIMO signals may be transmitted from different antenna elements or subgroups of elements of the wireless node simultaneously. Accordingly, the MIMO signals may be generated such that they can be received and decoded by the corresponding antenna element of the second wireless node. The wireless node may use any suitable component to perform the actions of block 520, such as a processor and/or one or more components of the MIMO transmitter system 210 shown in FIG. 2, such as the TX data processor 214, TX MIMO processor 220, processor 230, memory 232, transmitter/receiver 222 and/or antenna 224, or any other suitable component described above.

At block 530, the wireless node transmits the MIMO signals to the transceiver or transmitting element, including array of antenna elements 540, to be transmitted to the second wireless node. The MIMO signals are sent to designated antenna elements, or subgroups of antenna elements, and transmitted as wireless signals to the corresponding antenna elements, or subgroups of antenna elements, of the second wireless node. The transceiver transmits the signals through the focusing element 550, which is positioned in a signal path of each of the antenna elements of the array 540. The focusing element 550 is configured to direct each of the signals in different signal directions or paths such that at least a portion of the energy of each signal is received by the second wireless node. In this regard, the focusing element is configured to provide for higher channel ranks for MIMO communications, as the calculated channel for all rx/tx antenna pairs varies by a greater amount by using the focusing element 550. The wireless node may use any suitable component to perform the actions of block 530, such as a transceiver and/or one or more components of the MIMO transmitter system 210 shown in FIG. 2, such as the TX data processor 214, TX MIMO processor 220, processor 230, memory 232, transmitter/receiver 222 and/or antenna 224, or any other suitable component described above.

Depending on the precoding scheme implemented by a transmitter, a corresponding receiver may or may not perform joint processing when decoding a MIMO signal received from the transmitter. For instance, if a transmitter utilizes a SVD-based precoding scheme to generate a MIMO signal, the receiver may decode the received signal utilizing a SVD-based decoder. Alternatively, if a transmitter utilizes a zero-force-based precoding scheme to generate a MIMO signal, the receiver may not perform any specific processing related to the precoder.

FIG. 6 is a flow diagram of a communication method 600 according to some aspects of the present disclosure. Steps of the method 600 can be executed by a wireless communication device such as a BS (e.g., BS 105) or a UE (e.g., UE 115). The wireless node may utilize one or more components of the MIMO transmitter system 210 shown in FIG. 2, such as the TX data processor 214, TX MIMO processor 220, processor 230, memory 232, transmitter/receiver 222 and/or antenna 224, to execute the steps of method 600. The method 600 may employ similar mechanisms as described above with respect to FIGS. 3-5. As illustrated, the method 600 includes a number of enumerated steps, but aspects of the method 600 may include additional steps before, after, and in between the enumerated steps. In some aspects, one or more of the enumerated steps may be omitted or performed in a different order.

In one aspect, the method 600 is performed by a first wireless communication device that includes a plurality of antenna elements, a transceiver coupled to the plurality of antenna elements, and a focusing element positioned in a transmitting path of at least a first and second antenna element of the plurality of antenna elements. In some aspects, the focusing element is positioned in a transmitting path of all of the antenna elements of the plurality of antenna elements. The transceiver may be configured to transmit a MIMO signal to a second wireless communication device. The focusing element may include a focal length configured for short range or near field line-of-sight (LOS) communications. For example, the focusing element may include at least one of a lens or a dish antenna. In some aspects, the first wireless communication device includes an antenna panel including the plurality of antenna elements. The plurality of antenna elements may be spaced from one another. In some aspects, the spacing between adjacent antenna elements of the plurality of antenna elements is between 5 mm and 20 mm.

At block 610, the wireless communication device transmits, to a second wireless communication device using a focusing element and a first antenna element of a plurality of antenna elements, a first communication signal in a first direction. The actions of block 610 may be performed by any suitable means, including a transceiver comprising one or more antenna elements, a processor, one or more components of the MIMO transmitter system 210 shown in FIG. 2, such as the TX data processor 214, TX MIMO processor 220, processor 230, memory 232, transmitter/receiver 222 and/or antenna 224, or any other suitable component described above.

Block 610 includes blocks 612 and 614. At block 612, the wireless communication device transmits, to the second wireless communication device via a first antenna element of a plurality of antenna elements, a first communication signal. The wireless communication device may use any suitable means for performing the actions of block 612, including the first antenna element, the transceiver, processor, one or more components of the MIMO transmitter system 210 shown in FIG. 2, such as the TX data processor 214, TX MIMO processor 220, processor 230, memory 232, transmitter/receiver 222 and/or antenna 224, or any other suitable component described above.

At block 614, the wireless communication device transmits, to the second wireless communication device via a second antenna element of a plurality of antenna elements, a second communication signal. The wireless communication device may use any suitable means for performing the actions of block 614, including the second antenna element, the transceiver, processor, one or more components of the MIMO transmitter system 210 shown in FIG. 2, such as the TX data processor 214, TX MIMO processor 220, processor 230, memory 232, transmitter/receiver 222 and/or antenna 224, or any other suitable component described above.

At block 620, the wireless communication device directs the first communication signal in a first direction. The wireless communication device may use any suitable means for directing the first communication signal in the first direction, including a focusing element, which may include a lens (e.g., lens 320 with reference to FIGS. 3A-3C) and/or a dish (e.g., dish 420 with reference to FIGS. 4A-4C), such as a dish antenna, as described above.

At block 630, the wireless communication device directs the second communication signal in a second direction different from the first direction. The wireless communication device may use any suitable means for directing the second communication signal in the second direction, including a focusing element, which may include a lens (e.g., lens 320 with reference to FIGS. 3A-3C) and/or a dish (e.g., dish 420 with reference to FIGS. 4A-4C), such as a dish antenna, as described above.

In some aspects, the method 600 further includes generating, by a processor, a MIMO signal using a precoding scheme, where the precoding scheme is based on an arrangement of the plurality of antenna elements. For example, in some aspects, the precoding scheme may be based on the spacing, aperture size, or pattern distribution of the antenna elements of the antenna panel. In some aspects, a suitable precoding algorithm may include or otherwise involve scaling the amplitude and phase of different MIMO communication streams. The precoding scheme or algorithm may be further based on known channel state information. At the receiving wireless node, the different spatial signatures of the respective MIMO communication streams (and, in some examples, known channel state information) can enable the separation of these streams from one another.

It will be understood that the steps of the method 600 may be performed in an order other from what is shown. For example, in some aspects, the actions of block 614 may be performed simultaneously with, or before, the actions of block 612. In other aspects, the actions of block 630 may be performed simultaneously with, or before, the actions of block 620. In some aspects, the actions of blocks 620 and/or 630 may be performed simultaneously with the actions of block 610 (and blocks 612 and 614).

FIG. 7 is a flow diagram of a communication method 700 according to some aspects of the present disclosure. Steps of the method 700 can be executed by a wireless communication device such as a BS (e.g., BS 105) or a UE (e.g., UE 115). The wireless node may utilize one or more components of the MIMO transmitter system 210 shown in FIG. 2, such as the RX data processor 260, TX MIMO processor 280, processor 270, memory 272, transmitter/receiver 254 and/or antenna 252, to execute the steps of method 700. The method 700 may employ similar mechanisms as described above with respect to FIGS. 3-5. As illustrated, the method 700 includes a number of enumerated steps, but aspects of the method 700 may include additional steps before, after, and in between the enumerated steps. In some aspects, one or more of the enumerated steps may be omitted or performed in a different order.

In one aspect, the method 700 is performed by a first wireless communication device that includes a plurality of antenna elements, a transceiver coupled to the plurality of antenna elements, and a focusing element positioned in a receiving path of at least a first and second antenna element of the plurality of antenna elements. In some aspects, the focusing element is positioned in a receiving path of all of the antenna elements of the plurality of antenna elements. The transceiver may be configured to receive a MIMO signal from a second wireless communication device. The focusing element may include a focal length configured for short range or near field line-of-sight (LOS) communications. For example, the focusing element may include at least one of a lens or a dish antenna. In some aspects, the first wireless communication device includes an antenna panel including the plurality of antenna elements. The plurality of antenna elements may be spaced from one another. In some aspects, the spacing between adjacent antenna elements of the plurality of antenna elements is between 5 mm and 20 mm.

At block 710, the wireless communication device transmits, to a second wireless communication device using a focusing element and a first antenna element of a plurality of antenna elements, a first communication signal in a first direction. The actions of block 710 may be performed by any suitable means, including a transceiver comprising one or more antenna elements, a processor, one or more components of the MIMO transmitter system 250 shown in FIG. 2, such as the RX data processor 260, TX MIMO processor 280, processor 270, memory 272, transmitter/receiver 254 and/or antenna 252, or any other suitable component described above (including, for example, components described above with reference to block 610).

Block 710 includes blocks 712 and 714. At block 712, the wireless communication device receives, from the second wireless communication device via a first antenna element of a plurality of antenna elements, a first communication signal from a first direction. The wireless communication device may use any suitable means for performing the actions of block 712, including the first antenna element, the transceiver, processor, means for focusing or directing the first communication signal, one or more components of the MIMO transmitter system 250 shown in FIG. 2, such as the RX data processor 260, TX MIMO processor 280, processor 270, memory 272, transmitter/receiver 254 and/or antenna 252, or any other suitable component described above (including, for example, components described above with reference to block 612).

At block 714, the wireless communication device receives, from the second wireless communication device via a second antenna element of a plurality of antenna elements, a second communication signal from a second direction different from the first direction. The wireless communication device may use any suitable means for performing the actions of block 714, including the first antenna element, the transceiver, processor, means for focusing or directing the first communication signal, one or more components of the MIMO transmitter system 250 shown in FIG. 2, such as the RX data processor 260, TX MIMO processor 280, processor 270, memory 272, transmitter/receiver 254 and/or antenna 252, or any other suitable component described above (including, for example, components described above with reference to block 614).

At block 720, the wireless communication device directs the first communication signal in the first direction. The wireless communication device may use any suitable means for directing the first communication signal in the first direction, including a focusing element, which may include a lens (e.g., lenses 330 and/or 430 with reference to FIGS. 3A-3C and 4A-4C) and/or a dish (e.g., similar to dish 420 with reference to FIGS. 4A-4C), such as a dish antenna as described above.

At block 730, the wireless communication device directs the second communication signal in the second direction. The wireless communication device may use any suitable means for directing the second communication signal in the second direction, including a focusing element, which may include a lens (e.g., lenses 330 and/or 430 with reference to FIGS. 3A-3C and 4A-4C) and/or a dish (e.g., similar to dish 420 with reference to FIGS. 4A-4C), such as a dish antenna as described above.

It will be understood that the steps of the method 700 may be performed in an order other from what is shown. For example, in some aspects, the actions of blocks 720 and/or 730 are performed simultaneously with, or before, the actions of block 710 (including blocks 712 and 714). In this regard, it will be understood that the wireless communication device receives the first communication signal from the first direction in block 712 based on the directing the first communication signal in the first direction as performed at block 720. Further, the actions of block 714 may be performed simultaneously with, or before, the actions of block 712. In other aspects, the actions of block 730 may be performed simultaneously with, or before, the actions of block 720.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Other aspects of the present disclosure include:
1. A first wireless communication device, comprising:
    a plurality of antenna elements;
    a transceiver coupled to the plurality of antenna elements, the transceiver configured to transmit, to a second wireless communication device, a multiple-input-multiple-output (MIMO) signal, wherein the transceiver configured to transmit the MIMO signal is configured to:
        transmit, to the second wireless communication device via a first antenna element of the plurality of antenna elements, a first communication signal; and
        transmit, to the second wireless communication device via a second antenna element of the plurality of antenna elements, a second communication signal; and
    a focusing element positioned in a transmitting path of at least the first and second antenna elements, the focusing element configured to:
        direct the first communication signal in a first direction; and
        direct the second communication signal in a second direction different from the first direction.
2. The first wireless communication device of clause 1, wherein the focusing element has a diameter configured for short range line-of-sight (LOS) communications in a radiofrequency band.
3. The first wireless communication device of any of clauses 1 and 2, wherein the focusing element comprises a lens.
4. The first wireless communication device of any of clauses 1-3, wherein the focusing element comprises a dish antenna.
5. The first wireless communication device of any of clauses 1-4, further comprising a processor configured to:
    generate the MIMO signal using a precoding scheme, the precoding scheme being based on an arrangement of the plurality of antenna elements.
6. The first wireless communication device of clause 5, wherein the plurality of antenna elements are spaced from one another, and
    wherein the precoding scheme is based on a spacing of the plurality of antenna elements.
7. The first wireless communication device of any of clauses 1-6, further comprising a processor configured to:
    generate the MIMO signal using a precoding scheme, the precoding scheme being based on a measured channel matrix.
8. The first wireless communication device of any of clauses 1-7,
    wherein the transceiver is configured to simultaneously transmit the first communication signal and the second communication signal, and
    wherein the focusing element is configured to simultaneously direct the first communication signal in the first direction and direct the second communication signal in the second direction.
9. A first wireless communication device, comprising:
    a plurality of antenna elements;
    a transceiver configured coupled to the plurality of antenna elements, the transceiver configured to receive a multiple-input-multiple-output (MIMO) signal, wherein the transceiver configured to receive the MIMO signal is configured to:
    receive, from a second wireless communication device via a first antenna element of the plurality of antenna elements, a first communication signal from a first direction;
    receive, from the second wireless communication device via a second antenna element of the plurality of antenna elements, a second communication signal from a second direction different from the first direction;
    a focusing element positioned in a receiving path of at least the first and second antenna elements, the focusing element configured to:
direct the first communication signal in the first direction; and
direct the second communication signal in the second direction.
10. The first wireless communication device of clause 9, wherein the focusing element comprises a diameter configured for short range line-of-sight (LOS) communications in a radiofrequency band.
11. The first wireless communication device of any of clauses 9 and 10, wherein the focusing element comprises a lens.
12. The first wireless communication device of any of clauses 9-11, wherein the focusing element comprises a dish antenna.
13. The first wireless communication device of any of clauses 9-12, further comprising an antenna panel comprising the plurality of antenna elements, wherein the plurality of antenna elements are spaced from one another.

14. The first wireless communication device of any of clauses 9-13, wherein the focusing element is configured to direct the first communication signal in the first direction such that:
the first communication signal is focused on the first antenna element; and
the second communication signal is focused on the second antenna element.
15. The first wireless communication device of any of clauses 9-14, wherein the transceiver is configured to simultaneously receive the first communication signal and the second communication signal simultaneously.
16. The first wireless communication device of any of clauses 9-15, wherein the focusing element is configured to simultaneously direct the first communication signal in the first direction and the second communication signal in the second direction.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of) indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A first wireless communication device, comprising:
a plurality of antenna elements;
a transceiver coupled to the plurality of antenna elements, the transceiver configured to transmit, to a second wireless communication device, a multiple-input-multiple-output (MIMO) signal, wherein the transceiver configured to transmit the MIMO signal is configured to:
transmit, to the second wireless communication device via a first antenna element of the plurality of antenna elements, a first communication signal, and
transmit, to the second wireless communication device via a second antenna element of the plurality of antenna elements, a second communication signal; and
a focusing element positioned in a transmitting path of at least the first and second antenna elements, the focusing element configured to:
direct the first communication signal in a first direction, and
direct the second communication signal in a second direction different from the first direction.

2. The first wireless communication device of claim 1, wherein the focusing element comprises a diameter configured for short range line-of-sight (LOS) communications in a radiofrequency band.

3. The first wireless communication device of claim 1, wherein the focusing element comprises a lens.

4. The first wireless communication device of claim 1, wherein the focusing element comprises a dish antenna.

5. The first wireless communication device of claim 1, further comprising a processor configured to:
generate the MIMO signal using a precoding scheme, the precoding scheme being based on an arrangement of the plurality of antenna elements.

6. The first wireless communication device of claim 5, wherein the plurality of antenna elements are spaced from one another, and
wherein the precoding scheme is based on a spacing of the plurality of antenna elements.

7. The first wireless communication device of claim 1, further comprising a processor configured to:
generate the MIMO signal using a precoding scheme, the precoding scheme being based on a measured channel matrix.

8. The first wireless communication device of claim 1, wherein the transceiver is configured to simultaneously transmit the first communication signal and the second communication signal, and
wherein the focusing element is configured to simultaneously direct the first communication signal in the first direction and direct the second communication signal in the second direction.

9. A first wireless communication device, comprising:
a plurality of antenna elements;
a transceiver coupled to the plurality of antenna elements, the transceiver configured to receive, from a second wireless communication device, a multiple-input-multiple-output (MIMO) signal, wherein the transceiver configured to receive the MIMO signal is configured to:
receive, from the second wireless communication device via a first antenna element of the plurality of antenna elements, a first communication signal from a first direction, and
receive, from the second wireless communication device via a second antenna element of the plurality of antenna elements, a second communication signal from a second direction different from the first direction; and
a focusing element positioned in a receiving path of at least the first and second antenna elements, the focusing element configured to:
direct the first communication signal in the first direction, and
direct the second communication signal in the second direction.

10. The first wireless communication device of claim 9, wherein the focusing element comprises a diameter configured for short range line-of-sight (LOS) communications in a radiofrequency band.

11. The first wireless communication device of claim 9, wherein the focusing element comprises a lens.

12. The first wireless communication device of claim 9, wherein the focusing element comprises a dish antenna.

13. The first wireless communication device of claim 9, further comprising an antenna panel comprising the plurality of antenna elements, wherein the plurality of antenna elements are spaced from one another.

14. The first wireless communication device of claim 9, wherein the focusing element is configured to direct the first communication signal in the first direction such that:
the first communication signal is focused on the first antenna element; and
the second communication signal is focused on the second antenna element.

15. The first wireless communication device of claim 9, wherein the transceiver is configured to simultaneously receive the first communication signal and the second communication signal.

16. The first wireless communication device of claim 9, wherein the focusing element is configured to simultaneously direct the first communication signal in the first direction and direct the second communication signal in the second direction.

17. A first wireless communication device, comprising:
means for transmitting, to a second wireless communication device, a multiple-input-multiple-output (MIMO) signal, wherein the means for transmitting the MIMO signal comprises:
means for transmitting, to the second wireless communication device via a first antenna element, a first communication signal; and
means for transmitting, to the second wireless communication device via a second antenna element, a second communication signal;
means for directing the first communication signal in a first direction, wherein the means for directing the first communication signal in the first direction comprises means for directing the second communication signal in a second direction different from the first direction, and wherein the means for directing the first communication signal in the first direction is configured for short range line-of-sight (LOS) communications in a radiofrequency band.

18. The first wireless communication device of claim 17, wherein the means for directing the first communication signal in the first direction comprises a lens.

19. The first wireless communication device of claim 17, wherein the means for directing the first communication signal in the first direction comprises a dish antenna.

20. The first wireless communication device of claim 17, wherein the means for directing the first communication signal in the first direction comprises means for simultaneously directing the first communication signal in the first direction and the second communication signal in the second direction.

21. The first wireless communication device of claim 17, further comprising:
means for generating the MIMO signal using a precoding scheme, the precoding scheme being based on an arrangement of the means for transmitting the MIMO signal.

22. The first wireless communication device of claim 17, wherein the means for transmitting the MIMO signal comprises means for simultaneously transmitting the first communication signal and the second communication signal.

23. A first wireless communication device, comprising:
means for receiving, from a second wireless communication device, a multiple-input-multiple-output (MIMO) signal, wherein the means for receiving the MIMO signal comprises:
means for receiving, from the second wireless communication device via a first antenna element, a first communication signal from a first direction;
means for receiving, from the second wireless communication device via a second antenna element, a second communication signal from a second direction different from the first direction;
means for directing the first communication signal in the first direction, wherein the means for directing the first communication signal in the first direction comprises means for directing the second communication signal in the second direction, and wherein the means for directing the first communication signal in the first direction is configured for short range line-of-sight (LOS) communications in a radiofrequency band.

24. The first wireless communication device of claim 23, wherein the means for directing the first communication signal in the first direction comprises a lens.

25. The first wireless communication device of claim 23, wherein the means for directing the first communication signal in the first direction comprises a dish antenna.

26. The first wireless communication device of claim 23, wherein the means for directing the first communication signal in the first direction comprises:
means for focusing the first communication signal on the first antenna element; and
means for focusing the second communication signal on the second antenna element.

27. The first wireless communication device of claim 23, wherein the means for directing the first communication signal in the first direction comprises means for simultaneously directing the first communication signal in the first direction and the second communication signal in the second direction.

28. The first wireless communication device of claim 23, wherein the means for receiving the MIMO signal comprises means for simultaneously receiving the first communication signal and the second communication signal simultaneously.

* * * * *